(12) United States Patent
Gallagher

(10) Patent No.: US 6,904,180 B1
(45) Date of Patent: Jun. 7, 2005

(54) METHOD FOR DETECTING IMAGE INTERPOLATION

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 685 days.

(21) Appl. No.: 09/697,890

(22) Filed: Oct. 27, 2000

(51) Int. Cl.$^7$ .................................................. G06K 9/36
(52) U.S. Cl. ...................................... 382/280; 382/300
(58) Field of Search .............................. 382/280, 300, 382/273, 276; 358/525; 375/245

(56) References Cited

U.S. PATENT DOCUMENTS

| | | | |
|---|---|---|---|
| 3,647,949 A | | 3/1972 | Closs et al. |
| 4,303,803 A | | 12/1981 | Yatsuzuka |
| 5,265,219 A | * | 11/1993 | Gerson et al. ............... 704/219 |
| 5,692,065 A | * | 11/1997 | Prakash et al. .............. 382/112 |
| 5,754,536 A | * | 5/1998 | Schmidt ...................... 370/330 |
| 5,884,253 A | * | 3/1999 | Kleijn ......................... 704/223 |
| 6,178,261 B1 | * | 1/2001 | Williams et al. ............. 382/190 |
| 6,549,233 B1 | * | 4/2003 | Martin ........................ 348/273 |
| 6,549,678 B1 | * | 4/2003 | Gindele et al. .............. 382/254 |
| 6,590,871 B1 | * | 7/2003 | Adachi ........................ 370/307 |

OTHER PUBLICATIONS

The Focal Encyclopedia of Photography, Third Edition, Focal Press, Butterworth–Heinemann. Stoneham, MA, p. 94.

The whatis?com Encyclopedia of Technology Terms, QUE Publishing, A Division of Pearson Technology, Indianapolis, Indiana, p. 118.

* cited by examiner

Primary Examiner—Yon J. Couso
(74) Attorney, Agent, or Firm—David M. Woods

(57) ABSTRACT

A method for analyzing a digital image channel comprising the steps of providing a digital image channel, extracting a signal from the digital image channel, and using the extracted signal to determine whether the digital image channel is an interpolated digital image channel or a non-interpolated digital image channel. More specifically, the extracted signal comprises a signal related to differences between the values of neighboring pixels of the digital image channel, and the periodicity of the extracted signal is analyzed by computing a Fourier Transform signal of the extracted signal and looking for peaks in the Fourier Transform signal.

6 Claims, 5 Drawing Sheets

Fig. 2A ORIGINAL

Fig. 2E BILINEAR

Fig. 2I BICUBIC

Fig. 2B  *ddp(x,y)*

US 6,904,180 B1

METHOD FOR DETECTING IMAGE INTERPOLATION

FIELD OF THE INVENTION

The invention relates generally to the field of digital image processing and, more particularly, to a method for detecting if an image interpolation has been performed on an image.

BACKGROUND OF THE INVENTION

In the field of image processing, it is often the case that an image must be resized for a desired application. For example, the pixels per inch (or dpi dots per inch) of many display devices are fixed. A particular printer may have a resolution of 250 dpi, for example. In order to print an image consisting of 500 by 750 pixels to a 4 by 6 inch print on such a printer, the image must be resized by a factor of 2. In other words, the values of the image at locations between the original samples must be determined. This process of determining the value of an image signal at locations which are not coincident with the original samples of the image is called interpolation. The factor of interpolation, N, refers to the ratio of the sampling rate of the output image to the sampling rate of the input image. In the previous example, the interpolation factor N=2.

The process of interpolation produces an image of a desired number of rows and columns of pixels. However, the interpolation process involves "guessing" the signal value at many locations. As a result the interpolated image is generally not as high quality as an image originally captured at the desired resolution. For example, an image captured at 500×750 pixels and then interpolated to 1000×1500 pixels will generally appear softer and of lower quality than an image resulting from capturing that same scene at 1000×1500 pixels originally.

Because of the generally lower quality of interpolated images, it would be a desirable and valuable goal for an image processing system to have knowledge of whether an image had been interpolated. More precisely, it would be valuable for an image processing system to be able to distinguish a non-interpolated image from an interpolated image. Additionally, it would be desirable for the image processing system to have knowledge of the factor of interpolation N.

Consequently, it would be desirable to determine directly from the data contained within a digital image (the pixel locations and values) whether an image has been interpolated. It would further be desirable to determine the factor of interpolation directly from the data contained within the digital image.

SUMMARY OF THE INVENTION

The present invention is directed to overcoming one or more of the problems set forth above. Briefly summarized, according to one aspect of the present invention, the invention resides in a method for analyzing a digital image channel, extracting a signal from the digital image channel, and using the extracted signal to determine whether the digital image channel is an interpolated digital image channel or a non-interpolated digital image channel. More specifically, the extracted signal comprises a signal related to differences between the values of neighboring pixels of the digital image channel, and the periodicity of the extracted signal is analyzed by computing a Fourier Transform signal of the extracted signal and looking for peaks in the Fourier Transform signal.

The advantage of the invention is that it is able to determine directly from the data contained within a digital image whether an image has been interpolated, and furthermore what method of interpolation was used on the data and what factor of interpolation was employed.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 2A–2L shows several examples of digital images, and signals derived from the images in accordance with the interpolation detection method shown in FIG. 1.

DETAILED DESCRIPTION OF THE INVENTION

Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown, suggested or described herein may be selected from such materials, components and elements known in the art. In the following description, the present invention will be described as a method typically implemented as a software program. Those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

It is instructive to note that the present invention utilizes a digital image which is typically either a two-dimensional array of red, green, and blue pixel values or an array of monochromatic values corresponding to light intensities. As used herein, the term digital image refers to the whole two-dimensional array, or any portion thereof that is to be processed. In addition, the preferred embodiment is described with reference to an image of 1024 rows of pixels and 1536 lines of pixels, although those skilled in the art will recognize that digital images of different resolutions and dimensions may be used with equal, or at least acceptable, success. With regard to matters of nomenclature, the value of a pixel of a digital image located at coordinates (x,y), referring to the $x^{th}$ row and the $y^{th}$ column of the digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue channels. Additionally, a luminance channel p may be formed from the color channels. The value of a pixel of a digital image channel n located at coordinates (x,y), referring to the $x^{th}$ row and the $y^{th}$ column of the digital image channel, shall herein be a single value referred to as p(x,y).

Figure 1:
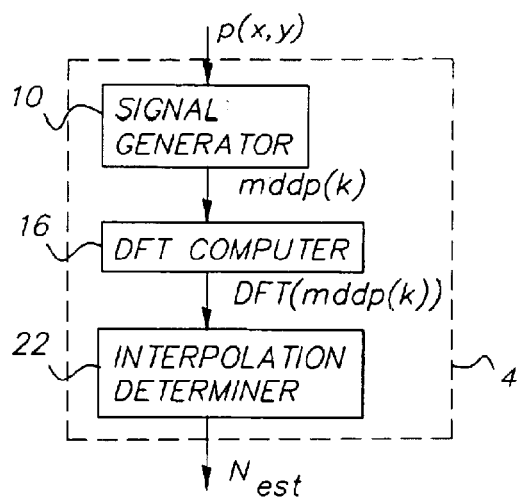
FIG. 1 is a block diagram illustrating an overview of the present interpolation detection method according to the invention.

Referring to the overview of the interpolation detector 4 shown in FIG. 1, a digital image channel p(x,y) is input to the signal generator 10. The digital image channel p(x,y) falls either into the category of a non-interpolated image or an interpolated image. The digital image channel p(x,y) is an interpolated image if it has been derived from some other source digital image channel m(x,y) and if the sampling rate of p(x,y) is higher than the sampling rate of m(x,y). In addition, the digital image channel p(x,y) will generally be of greater size (in terms of number of pixels in the digital image channel) than the source digital image channel m(x,y), unless a cropping step is involved. The input image channel signal generator 10 creates and outputs a one-dimensional signal mddp(k) from the input digital image channel p(x,y). If the digital image channel p(x,y) is the result of an interpolation operation prior to being input to the signal generator 10, then the signal mddp(k) contains a periodicity corresponding to the interpolation factor N and method, as will be further explained hereinbelow. However, if the digital image channel p(x,y) is a non-interpolated digital image channel, then the signal mddp(k) will not contain any particular periodicities. The purpose of the signal generator 10 is to generate a signal that contains a periodic component corresponding to the interpolation factor N only if the input digital image channel p(x,y) had been interpolated. The signal generator 10 will be described in greater detail hereinbelow. Note that the input digital image channel p(x,y) consists of R rows of pixels and C columns of pixels.

The digital signal mddp(k) output from the signal generator 10 is input to the DFT computer 16 for the computation of the Discrete Fourier Transform. The Discrete Fourier Transform of a time or space signal is a frequency domain representation of the signal. Periodicity in the mddp(k) signal may be determined by looking for peaks in the DFT[mddp(k)] signal output by the DFT computer 16. The Discrete Fourier Transform of the mddp(k) signal, DFT[mddp(k)], is input to the interpolation determiner 22 for analysis. The computation of the Discrete Fourier Transform is well known in the art of signal processing and will not be further discussed. In the preferred embodiment, the mddp(k) signal is padded with zeros until its length is a power of 2. The number of samples of the DFT will herein be referred to by M, where M is the smallest power of 2 equal to or greater than C-2.

The DFT[mddp(k)] signal input to the interpolation determiner 22 is analyzed to determine if significant peaks exist. The existence of peaks in the DFT[mddp(k)] signal indicates that the digital image channel p(x,y) is an interpolated digital image channel. The output of the interpolation determiner is an indication of whether or not the image p(x,y) is an interpolated digital image channel as well as an indication of the interpolation factor N in the case that p(x,y) is an interpolated digital image channel. The operation of the interpolation determiner 22 is described below.

Figure 4:
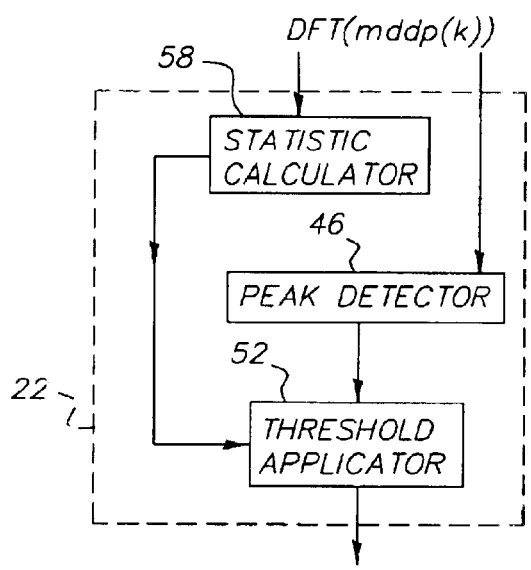
FIG. 4 shows a block diagram of the interpolation determiner shown in FIG. 1.

The interpolation determiner 22 accepts as input the signal DFT[mddp(k)]. The interpolation determiner 22 examines the magnitude of the input signal to determines if any peaks are present. FIG. 4 shows an exploded view of the interpolation determiner illustrating a peak detector 46, which locates the peaks of the input signal DFT[mddp(k)], and a threshold detector 52, which compares the magnitude of the peak detector output signal against certain thresholds. Many peak detection methods exist. Those skilled in the art will recognize that any number of peak detection algorithms may be used by the peak detector 46 in order to determine the location $k_o$ of the largest peak of the signal DFT[mddp(k)]. In the preferred embodiment, for a location $k_o$ to be classified as a peak, $k_o$ must be between M/x−1 and M/2+1, where x=12 in the preferred embodiment. Additionally the magnitude of the signal DFT[mddp(k)] must be greater than the magnitude at all locations within (M)/12 samples of $k_o$. Furthermore, the threshold applicator 52 requires that the magnitude of the signal DFT[mddp(k)] must be greater than Tσ, where a is the standard deviation of the magnitude of the DFT[mddp(k)] signal, evaluated between (M)/12−1 and (M)/2+1. The value of σ is determined by the statistic calculator 58. Those skilled in the art will recognize that many variations of the statistic calculator 58, for example Mean Absolute Deviation rather than standard deviation, will yield acceptable results. T is an arbitrary constant. In the preferred embodiment, T=4. The value of $N_{est}$, the estimate of the interpolation factor N, is determined with the location of the peak $k_o$ corresponding to the greatest magnitude. If the interpolation determiner 22 finds no peaks associated with the signal DFT[mddp(k)], then the interpolation determiner outputs information indicating that it believes that the digital image channel p(x,y) has not been interpolated. Alternatively, if the interpolation determiner 22 finds one or more peaks, then the interpolation determiner 22 outputs information indicating that it believes that the digital image channel p(x,y) has been interpolated. Additionally $N_{est}$ is output by the interpolation determiner 22. The value of $N_{est}$ is found with the following formula, where $k_o$ is the index of the peak and M is the number of samples in the DFT [mddp(k)] signal:

$$N_{est}=k_o/M$$

Note that in regard to indexes of the DFT, the index 0 refers to the first sample of the DFT and is the DC term.

Figure 3A:
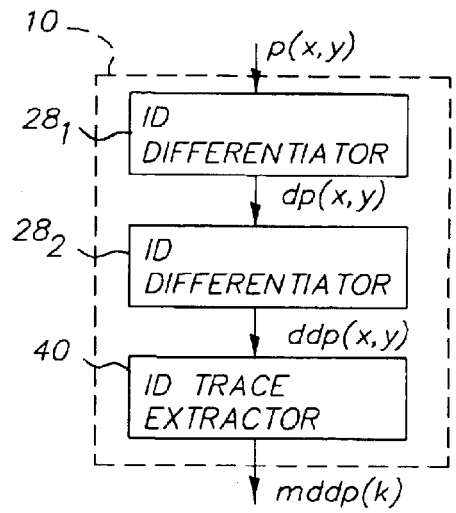
FIGS. 3A and 3B show alternative block diagram embodiments of the signal generator shown in FIG. 1.

FIG. 3A shows an exploded block diagram of the signal generator 10. As previously explained, the purpose of the signal generator 10 is to extract a signal from the digital image channel which will exhibit a periodic property only if the digital image channel is interpolated. The digital image channel p(x,y) is input to the 1D differentiator $28_1$. The purpose of the 1D differentiator $28_1$ is to calculate local pixel to pixel variations within the image. In the preferred embodiment, these pixel to pixel differences are determined by computing two successive derivatives along each row of the digital image channel. Note that the processing may be performed with equal success along the image columns. The 1D differentiator $28_1$ computes the derivative of each row of the digital image channel to create a derivative digital image channel dp(x,y). The following formula is used by the 1D differentiator $28_1$ to create the derivative digital image channel dp(x,y).

$$dp(x,y)=p(x+1,y)-p(x,y)$$

Next, the derivative digital image channel dp(x,y) is input to a second 1D differentiator $28_2$ for a second computation of a derivative of each row. The output of this second 1D differentiator $28_2$ is a digital image channel representing the second derivative of each row of the digital image channel p(x,y). The following formula is used by the 1D differentiator $28_2$ to create the second derivative digital image channel ddp(x,y):

$$ddp(x,y)=dp(x+1,y)-dp(x,y)=p(x+2,y)-2p(x+1,y)+p(x,y)$$

Notice that the two stages of 1D differentiators 28 may be combined to a direct calculation of ddp(x,y) from p(x,y) as shown in the preceding equation.

The purpose of the two stages of the 1D differentiators 28 is to generate a two dimensional signal where the value of the signal on average has different properties at pixel locations corresponding to samples of the original digital image channel m(x,y) (from which p(x,y) was interpolated). The signal ddp(x,y) generally has a large average value at locations corresponding with samples of the original digital image channel m(x,y) and a small average value at locations between samples of the original digital image channel.

The ddp(x,y) signal is then input to the 1D trace extractor 40. The purpose of the 1D trace extractor is to produce a high signal to noise ratio one-dimensional trace from the ddp(x,y) signal, which exhibits a periodicity directly related to the interpolation factor N. In the preferred embodiment, the 1D trace extractor 40 produces a one dimensional trace mddp(k) by averaging the magnitudes of values across columns as shown in the following formula:

$$mddp(k) = \sum_{y=0}^{R} |ddp(k, y)|$$

Those skilled in the art will recognize that the purpose of the signal generator 10 may be accomplished by many methods. Those skilled in the art will further recognize that methods which aim at creating a signal exhibiting a periodicity related to the interpolation factor N from a digital image channel p(x,y) do not deviate from the scope of the present invention.

Figure 3B:
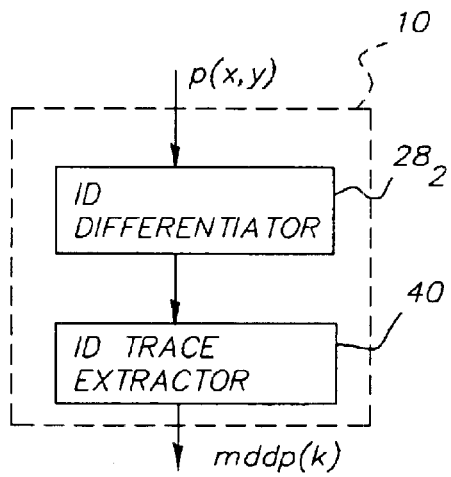

FIG. 3B shows an alternative embodiment of the signal generator 10, wherein only a single 1D differentiator 28 is used. This embodiment yields accurate results, although not quite as reliable as with the preferred embodiment.

Many alternative embodiments exist as well for the 1D trace extractor 40. For instance, the signal mddp(k) may be computed by finding the standard deviations (or variances) of each row or column of the signal input to the 1D trace extractor 40. In general, the variances of columns or rows of the digital image channel input to the 1D trace extractor 40 are highest when the row or column is coincident with samples of the original digital image channel m(x,y) from which p(x,y) was interpolated. Thus, the mddp(k) signal may be computed by the 1D trace extractor 40 by the following variance-based formula:

$$mddp(k) = \frac{1}{R}\sum_{y=0}^{R} ddp(k, y)^2 - \frac{1}{R^2}\left[\sum_{y=0}^{R} ddp(k, y)\right]^2$$

Other alternative embodiments exist by rearranging the block diagrams already shown. For example, it is possible to compute the DFT of each row of the ddp(x,y) signal, and then average these DFTs together in order to create the one dimensional signal to input to the interpolation determiner 22. Likewise, it is also possible to compute the DFT of each row of the ddp(x,y) signal, then input each DFT to the interpolation determiner 22 for peak detection. Each row of the p(x,y) digital image channel would then have an $N_{est}$. These multiple values of $N_{est}$ may then be combined by methods familiar to those skilled in the art of pattern recognition to achieve a single value of $N_{est}$ for the entire image.

Figure 2F:
Figure 2F:
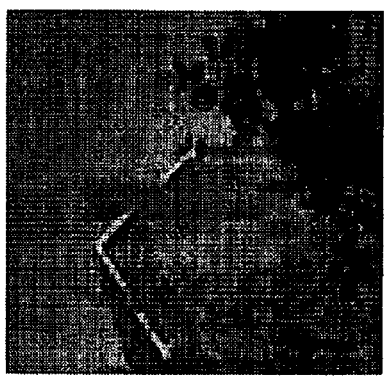
Figure 2F:
Figure 2F:
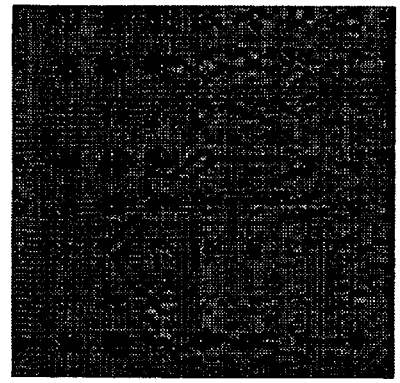
Figure 2F:
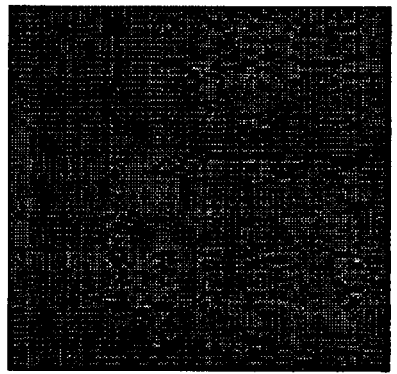
Figure 2J:
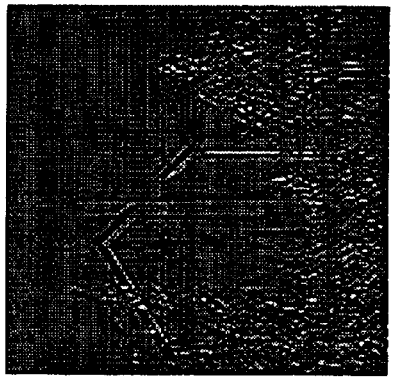
Figure 2C:
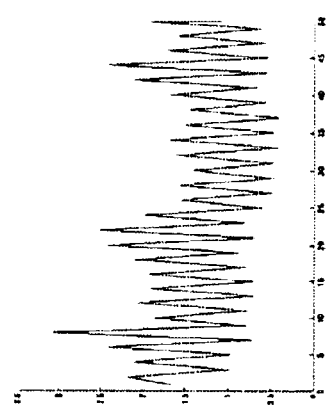

With reference to FIGS. 2A–2L, example images and related signals are shown to further illustrate the concepts embodied by the present invention. FIG. 2A shows a non-interpolated image $p_1(x,y)$, and FIG. 2B shows an image representing the second derivative ddp(x,y) of each row (column) of the image $p_1(x,y)$. A small portion of the signal mddp(k) output from the signal generator 10 is also shown in FIG. 2C. In this case, the signal mddp(k) does not show any particular pattern or periodicity. Thus, the signal DFT [mddp(k)] shown in FIG. 2D computed by the DFT computer 16 shows no particularly significant peaks. When this signal is input to the interpolation determiner 22, no peaks are found and the interpolation determiner outputs information indicating that the digital image channel $p_1(x,y)$ is a non-interpolated digital image channel.

Figure 2G:
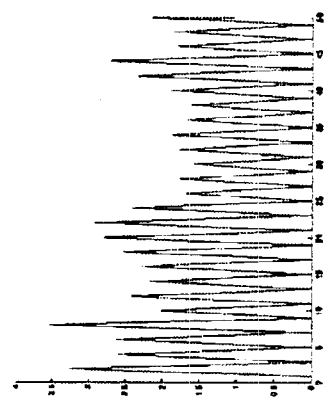

Alternatively, FIG. 2E shows an interpolated image $p_2(x,y)$, and FIG. 2F shows an image representing the second derivative ddp(x,y) of each row (column) of the image $p_2(x,y)$. The digital image channel $p_2(x,y)$ was created with bilinear interpolation applied to $p_1(x,y)$ with a factor of interpolation of N=2. Therefore, $p_2(x,y)$ is an interpolated digital image channel. A small portion of the signal mddp(k) output from the signal generator 10 is shown in FIG. 2G. Note that this signal exhibits a strongly periodic function, with a cycle of 2 pixels. This observation is confirmed by the magnitude of the DFT[mddp(k)] signal, also shown in FIG. 2H. This signal is input to the interpolation determiner 22, which detects a peak. The interpolation determiner 22 then outputs information indicating that the image $p_2(x,y)$ is an interpolated image. The estimate of interpolation is $N_{est}$= 2.00.

Figure 2K:
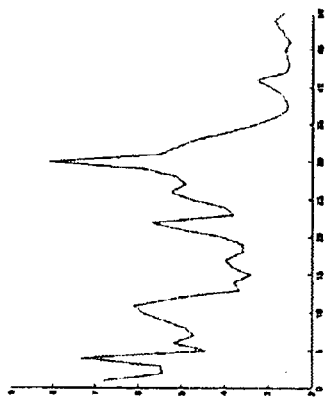
Figure 2D:
Figure 2H:
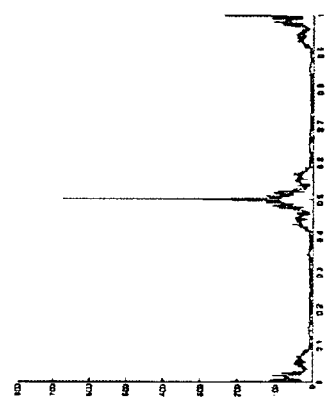
Figure 2L:
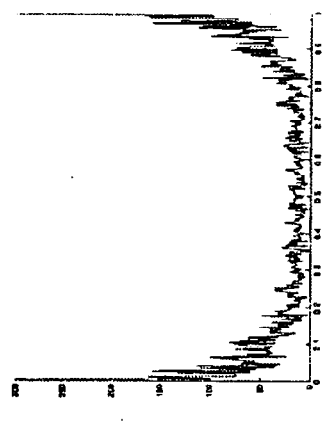

As a further alternative, FIG. 2I shows an interpolated image $p_3(x,y)$, and FIG. 2J shows an image representing the second derivative ddp(x,y) of each row (column) of the image $p_3(x,y)$. The digital image channel $p_3(x,y)$ was created with bicubic interpolation applied to $p_1(x,y)$ with a factor of interpolation of N=2. Therefore, $p_3(x,y)$ is an interpolated digital image channel. A small portion of the signal mddp(k) output from the signal generator 10 is shown in FIG. 2K. Note that this signal exhibits a strongly periodic function, with a cycle of 2 pixels. This observation is confirmed by the magnitude of the DFT[mddp(k)] signal, also shown in FIG. 2L. This signal is input to the interpolation determiner 22, which detects a peak. The interpolation determiner 22 then outputs information indicating that the image $p_3(x,y)$ is an interpolated image. The estimate of interpolation is $N_{est}$× 2.00.

Figure 5:
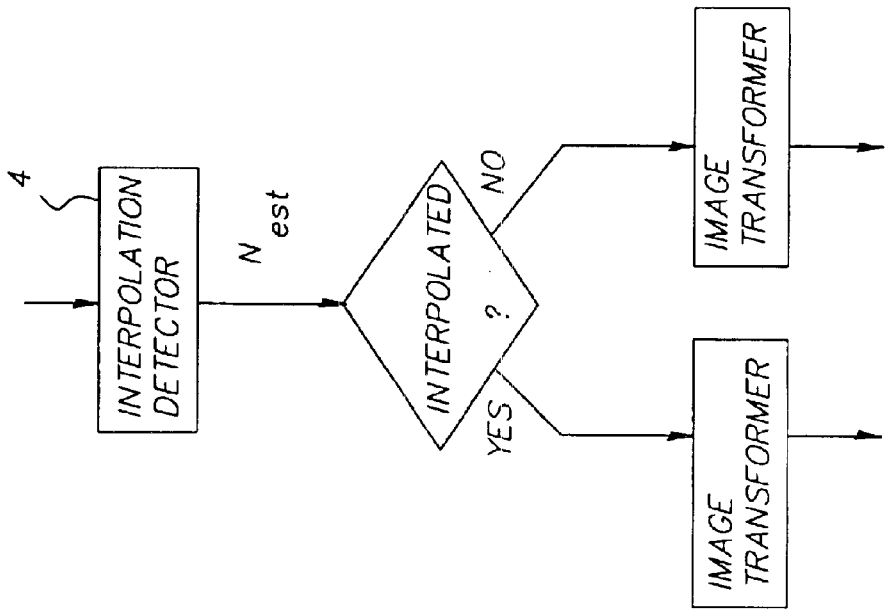
FIG. 5 illustrates an image processing chain involving several branches, which utilizes the output of the interpolation detection method shown in FIG. 1.

FIG. 5 shows an image processing chain with a branching step, where the selection of an image processing path from one of the two branches is based on the output of the interpolation detector 4. For example, many web photofinishing sites contain resolution warnings when a consumer requests a photograph print at a resolution of less than 150 dpi. An uninformed consumer may attempt to avoid this warning by using image processing software to interpolate the image and increase the image resolution, believing that the problem causing the "resolution warning" has been solved. The method of the present invention would recognize that the image had been interpolated and allows a system to issue a resolution warning to the consumer. Additionally, the method of the invention allows a system to educate the consumer in order to explain that while interpolation increases the number of pixels in a digital image channel, new information is not generally introduced.

Figure 6:
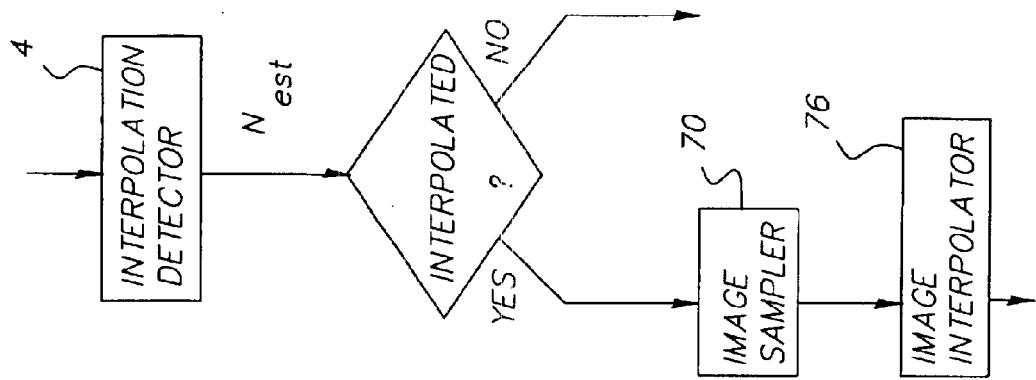
FIG. 6 illustrates another embodiment of an image processing chain involving recovery of the original digital image signal from the output of the interpolation detection method shown in FIG. 1.

Another application of the present method of detecting an interpolated image is illustrated in FIG. 6. As previously mentioned, image interpolation is commonly performed by bicubic and bilinear interpolation. However, a plethora of algorithms exist which claim to provide improved image interpolation. For example, often times, interpolation by an integer factor of N when using either bicubic or bilinear interpolation preserves the values of each sample of the digital image channel m(x,y) in the image p(x,y). The present invention may then be used to indicate when the image p(x,y) is an interpolated image. In the case that it is, then the original digital image channel m(x,y) may often be recovered exactly when N is an integer. This is accomplished by sampling the image p(x,y) at a rate indicated by $N_{est}$ with an image sampler 70. The low resolution version p(x,y) may then be interpolated up to the image dimension of p(x,y) with an image interpolator 76 using a more advanced image interpolation algorithm than would have been previously used.

When JPEG compression is present in the digital image channel p(x,y), the JPEG decoding often has an effect similar to interpolating an image by a factor of 8 in each dimension. When moderate or large quantization is implemented by the JPEG encoding, the present invention will often classify an image as having been interpolated by a factor of 8. This result may be used as a measure of quality loss associated with the JPEG compression. For example, a JPEG deblocking algorithm may be implemented when the present invention determines that the image p(x,y) has been interpolated by a factor of 8.

The result of the present invention may be used in order to select between different parameter sets. For example, a sharpening algorithm may require one set of parameters if the input image is non-interpolated and a second set of parameters if the input image has been interpolated.

Finally, the result of the present invention may be used to add metadata, information about an image in addition to the pixel values of the image, to the digital image channel. For example, if the present invention determines that a digital image channel p(x,y) has been interpolated by a factor of 4, then this historical information may be appended to the metadata associated with that digital image channel. Note that metadata is not necessarily stored in the same file as is the digital image channel data.

Figure 7:
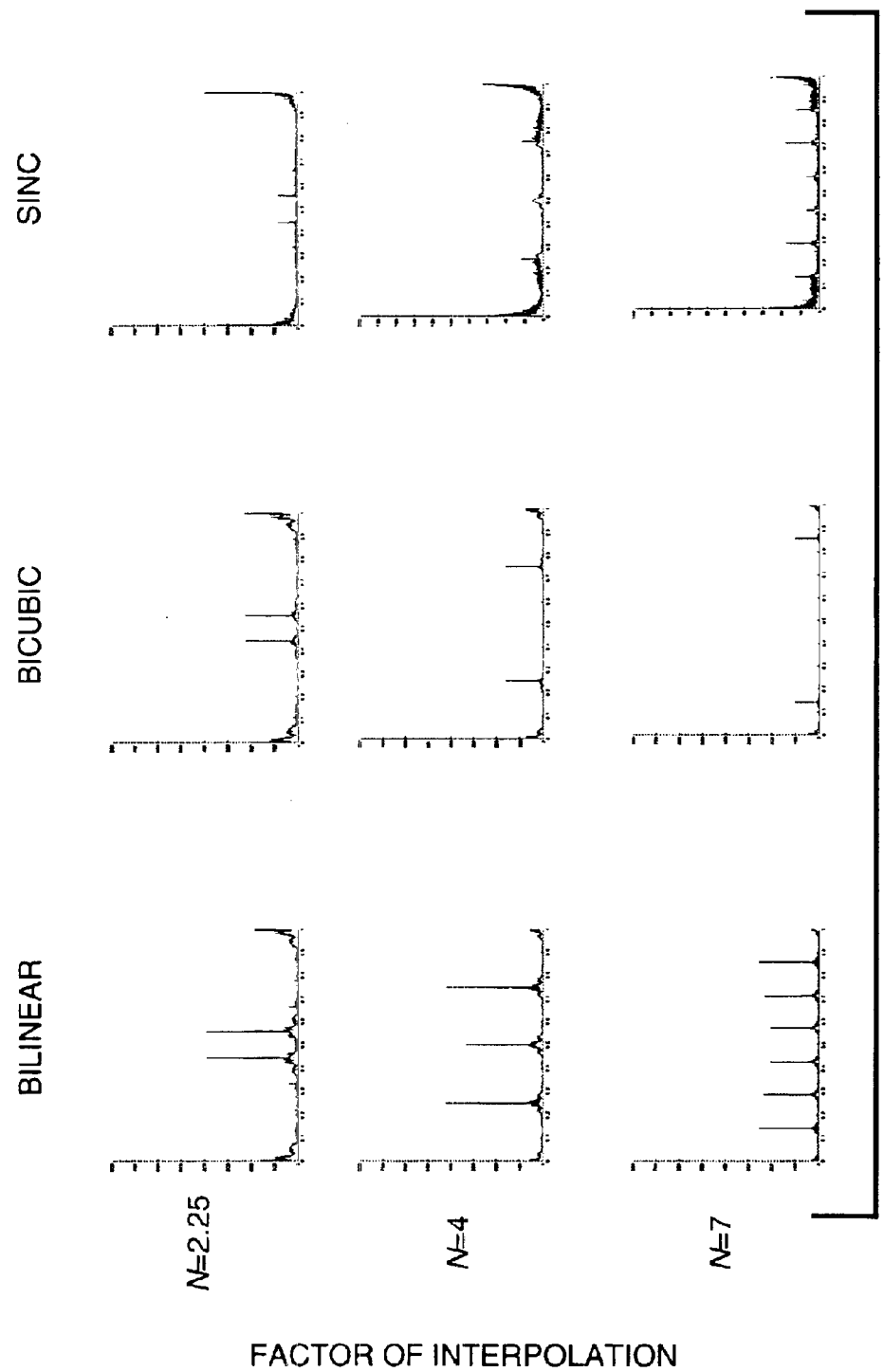
FIG. 7 shows examples of DFT $[mddp(k)]$ signals for a variety of interpolators and interpolation factors N.

FIG. 7 shows examples of DFT[mddp(k)] signals for a variety of interpolators and interpolation factors N. These plots illustrate the prominence of the peaks which are detected and used to determine an estimate of N by the present invention. The method successfully allows for the determination of whether an image has been interpolated. Additionally, the preferred embodiment also allows for an estimate of N to be made. As shown in FIG. 7, the preferred embodiment performs acceptably for both integer values of N and non-integer values of N. One may also notice in FIG. 7 that the interpolation method (e.g., bilinear, bicubic, or sinc) may be determined from the signal DFT[mddp(k)]. If the signal DFT[mddp(k)] has a peak at integer multiples of $k_0$, then the method of interpolation is likely to be bilinear. If the signal DFT[mddp(k)] does not have a peak at integer multiples of $k_0$, then the method of interpolation is likely to be bicubic. Because bilinear and bicubic interpolation are the most common methods of interpolation, the present invention has the ability to determine the method of interpolation in most cases.

As a testament to the effectiveness of the present invention, out of 50 non-interpolated images, the present invention correctly classified 49 of the images as non-interpolated. Table 1 shows the results of the present invention when operated on images interpolated with different interpolation factors N and different methods of interpolation. An entry of 50 in Table 1 represents a correct determination 100% of the time. The method is robust both as to determining the interpolation factor and as to determining the method of interpolation.

TABLE 1

Results of the interpolation detection algorithm

|  | Interpolation Factor N: Method: | | | | |
|---|---|---|---|---|---|
|  | 2 | 2.25 | 2.5 | 4 | 7 |
| Bicubic | 50 | 50 | 50 | 49 | 48 |
| Bilinear | 50 | 50 | 50 | 49 | 49 |

Notice that the present invention can successfully detect the interpolation factor N even when N is not an integer value. An alternative method of interpolation detection comprises the steps of essentially selecting samples (at regular intervals) of a digital image channel p(x,y) and proposing that these samples constitute an original image channel. Various method of interpolation may then be utilized to reconstruct the "high resolution" image from the samples. This interpolated version may then be compared with the digital image channel for correlation. A high correlation would indicate that the interpolation method and factor were correctly determined. While this alternative method would intuitively provide the desired result, the detection of an arbitrary non-integer interpolation factor would be difficult.

The present invention has been described with reference to a preferred embodiment. Changes may be made to the preferred embodiment without deviating from the scope of the present invention. Such modifications to the preferred embodiment do not significantly deviate from the scope of the present invention.

PARTS LIST 4 interpolation detector
10 signal generator
16 DFT computer
22 interpolation determiner
28 1D differentiator
40 1D trace extractor
46 peak detector
52 threshold applicator
58 statistic calculator
70 image sampler
76 image interpolator

What is claimed is:

1. A method of analyzing a digital image channel comprising the steps of:
    a) providing a digital image channel;
    b) extracting a signal from the digital image channel; and
    c) using the extracted signal to determine whether the digital image channel is an interpolated digital image channel or a non-interpolated digital image channel;

wherein the step b) of extracting a signal comprises extracting a signal related to differences between the values of neighboring pixels of the digital image channel.

2. A method of analyzing a digital image channel comprising the steps of:
   a) providing a digital image channel;
   b) extracting a signal from the digital image channel; and
   c) using the extracted signal to determine whether the digital image channel is an interpolated digital image channel or a non-interpolated digital image channel;
   wherein the step c) of using the extracted signal comprises determining the periodicity of the extracted signal by computing a Fourier Transform signal of the extracted signal and looking for peaks in the Fourier Transform signal.

3. An image processing system for determining the interpolation attributes of a digital image channel, said system comprising:
   means for extracting a signal from the digital image channel; and
   means for using the extracted signal to determine whether the digital image channel is an interpolated digital image channel or a non-interpolated digital image channel;
   wherein said means for extracting a signal comprises means for extracting a signal related to differences between the values of neighboring pixels of the digital image channel.

4. An image processing system for determining the interpolation attributes of a digital image channel, said system comprising:
   means for extracting a signal from the digital image channel; and
   means for using the extracted signal to determine whether the digital image channel is an interpolated digital image channel or a non-interpolated digital image channel;
   wherein said means for using the extracted signal comprises means for determining the periodicity of the extracted signal by computing a Fourier Transform signal of the extracted signal and looking for peaks in the Fourier Transform signal.

5. A method of analyzing a digital image channel comprising the steps of:
   extracting a signal from the digital image channel; and
   using the extracted signal to determine whether the digital image channel is an interpolated digital image channel or a non-interpolated digital image channel;
   wherein said extracting a signal comprises extracting a signal related to differences between the values of neighboring pixels of the digital image channel.

6. A method of analyzing a digital image channel comprising the steps of:
   extracting a signal from the digital image channel; and
   using the extracted signal to determine whether the digital image channel is an interpolated digital image channel or a non-interpolated digital image channel;
   wherein said using the extracted signal comprises determining the periodicity of the extracted signal by computing a Fourier Transform signal of the extracted signal and looking for peaks in the Fourier Transform signal.

* * * * *